United States Patent
Lee et al.

(10) Patent No.: US 11,081,281 B2
(45) Date of Patent: Aug. 3, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Sang Roc Lee, Suwon-si (KR); Dong Hwi Shin, Suwon-si (KR); Sang Soo Park, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 18 days.

(21) Appl. No.: 16/202,053

(22) Filed: Nov. 27, 2018

(65) Prior Publication Data

US 2020/0105475 A1 Apr. 2, 2020

(30) Foreign Application Priority Data

Oct. 2, 2018 (KR) .......................... 10-2018-0117400

(51) Int. Cl.
| | | |
|---|---|---|
| *H01G 4/30* | (2006.01) | |
| *H01G 4/12* | (2006.01) | |
| *H01G 4/008* | (2006.01) | |

(52) U.S. Cl.
CPC .............. *H01G 4/30* (2013.01); *H01G 4/008* (2013.01); *H01G 4/1227* (2013.01)

(58) Field of Classification Search
CPC ......... H01G 4/30; H01G 4/008; H01G 4/1227
See application file for complete search history.

(56) References Cited

U.S. PATENT DOCUMENTS 9,370,102 B2 * 6/2016 Lee .................... H05K 1/162
9,786,434 B2 * 10/2017 Choi .................... H01G 2/06
(Continued)

FOREIGN PATENT DOCUMENTS

| JP | 2011-018874 A | 1/2011 |
|---|---|---|
| JP | 2014-220324 A | 11/2014 |

(Continued)

OTHER PUBLICATIONS

Korean Office Action dated Aug. 29, 2019 issued in Korean Patent Application No. 10-2018-0117400 (with English translation).

*Primary Examiner* — Dion Ferguson
(74) *Attorney, Agent, or Firm* — Morgan, Lewis & Bockius LLP

(57) ABSTRACT

A multilayer ceramic electronic component includes a ceramic body including dielectric layers and a plurality of internal electrodes disposed to face each other with each of the dielectric layers interposed therebetween, and external electrodes disposed on external surfaces of the ceramic body and electrically connected to the internal electrodes, respectively. The external electrodes include electrode layers electrically connected to the internal electrodes and conductive resin layers disposed on the electrode layers, and the conductive layers are disposed to extend first and second surfaces of the ceramic body. When a distance from an outer edge of one of the first or second external electrodes disposed on a first or second surface to an inner edge thereof is defined as BW and surface roughness of the ceramic body is defined as Ra, a ratio of 100 times the surface roughness Ra to the distance BW (Ra*100/BW) satisfies (Ra*100/BW) ≤1.0.

15 Claims, 2 Drawing Sheets

(56) References Cited

U.S. PATENT DOCUMENTS

| | | | |
|---|---|---|---|
| 10,264,680 B2* | 4/2019 | Lee | H05K 1/185 |
| 2009/0002918 A1* | 1/2009 | Kawasaki | H01G 4/232 |
| | | | 361/311 |
| 2010/0091429 A1* | 4/2010 | Koga | H01G 4/012 |
| | | | 361/321.2 |
| 2011/0007449 A1* | 1/2011 | Seo | H01G 4/232 |
| | | | 361/321.2 |
| 2012/0327555 A1 | 12/2012 | Ahn et al. | |
| 2013/0050898 A1 | 2/2013 | Seo et al. | |
| 2014/0063683 A1* | 3/2014 | Gu | H01G 4/30 |
| | | | 361/301.4 |
| 2014/0182907 A1* | 7/2014 | Lee | H01G 4/30 |
| | | | 174/258 |
| 2015/0060122 A1* | 3/2015 | Lee | H05K 1/185 |
| | | | 174/260 |
| 2015/0092316 A1 | 4/2015 | Chun et al. | |
| 2015/0109718 A1* | 4/2015 | Choi | H01G 2/06 |
| | | | 361/304 |
| 2017/0040112 A1* | 2/2017 | Tanaka | H01G 4/012 |
| 2018/0174753 A1* | 6/2018 | Terashita | H01G 4/248 |

FOREIGN PATENT DOCUMENTS

| | | |
|---|---|---|
| KR | 10-2013-0006799 A | 1/2013 |
| KR | 10-2013-0023612 A | 3/2013 |
| KR | 10-2014-0086481 A | 7/2014 |
| KR | 10-2015-039479 A | 4/2015 |

* cited by examiner

MULTILAYER CERAMIC ELECTRONIC COMPONENT

CROSS-REFERENCE TO RELATED APPLICATION(S)

This application claims the benefit of priority to Korean Patent Application No. 10-2018-0117400 filed on Oct. 2, 2018 in the Korean Intellectual Property Office, the disclosure of which is incorporated herein by reference in its entirety.

TECHNICAL FIELD

The present disclosure relates to a multilayer ceramic electronic component, and more particularly, to a multilayer ceramic electronic component having excellent reliability.

BACKGROUND

With the recent trend for the downsizing, thinning, and multifunctionalization of electronic products, multilayer ceramic capacitors have also been required to be miniaturized and the mounting of multilayer ceramic capacitors has also been highly integrated.

A multilayer ceramic capacitor, a type of electronic component, is mounted on the printed circuit boards of various types of electronic products, including display devices such as a liquid crystal display (LCD), a plasma display panel (PDP), and the like, computers, personal digital assistants (PDAs), mobile phones, and the like, serving to charge or discharge electricity.

Such a multilayer ceramic capacitor may be used as a component of various types of electronic devices, due to advantages thereof such as compactness, high capacitance, and ease of mounting.

Recently, as industrial interest in electronic components is increasing, multilayer ceramic capacitors have been required to have high-reliability and high-strength characteristics to be used in automobile or infotainment systems.

In detail, a multilayer ceramic capacitor is required to have high flexural strength characteristics. Accordingly, internal and external structures for improving flexural characteristics need to be improved.

SUMMARY

An aspect of the present disclosure may provide a multilayer ceramic electronic component having excellent reliability.

According to an aspect of the present disclosure, a multilayer ceramic electronic component includes a ceramic body including dielectric layers and a plurality of internal electrodes disposed to face each other with each of the dielectric layers interposed therebetween, the ceramic body having first and second surfaces disposed to oppose each other in a first direction, third and fourth surfaces connected to the first and second surfaces and disposed to oppose each other, and fifth and sixth surfaces connected to the first to fourth surfaces and disposed to oppose each other, and external electrodes disposed on external surfaces of the ceramic body and electrically connected to the internal electrodes, respectively. The external electrodes include electrode layers electrically connected to the internal electrodes and conductive resin layers disposed on the electrode layers, and the conductive layers are disposed to extend the first and second surfaces of the ceramic body. When a distance from an outer edge of one of the first or second external electrodes disposed on the first or second surface to an inner edge thereof is defined as BW and surface roughness of the ceramic body is defined as Ra, a ratio of 100 times the surface roughness Ra to the distance BW (Ra*100/BW) satisfies (Ra*100/BW)≤1.0.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

Figure 1:
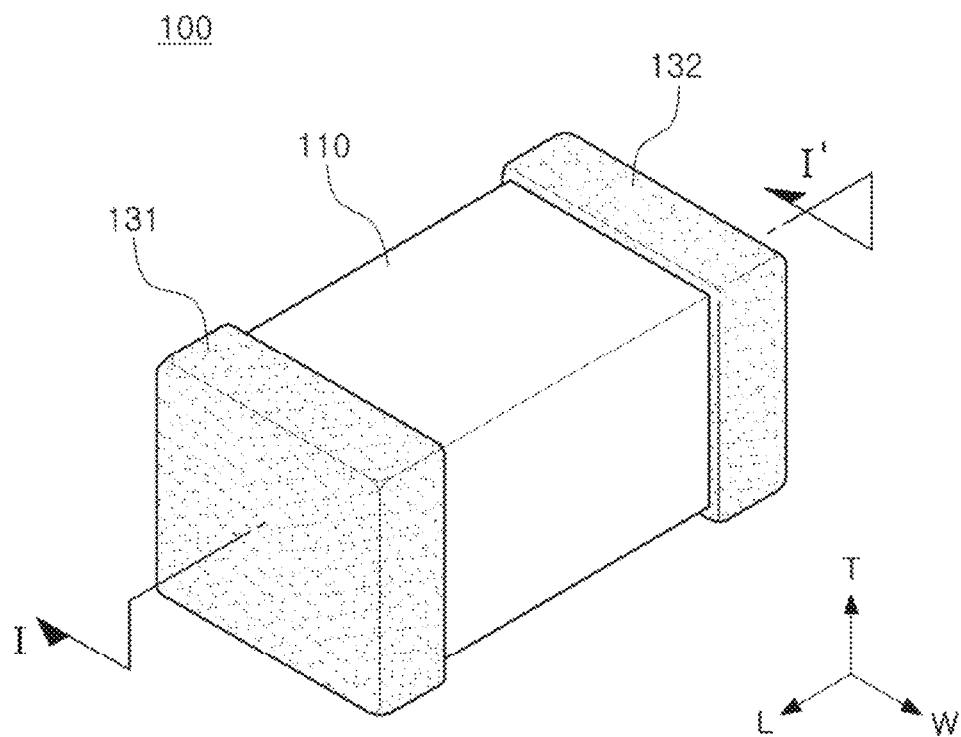
FIG. 1 is a perspective view of a multilayer ceramic capacitor according to an exemplary embodiment in the present disclosure.
Figure 2:
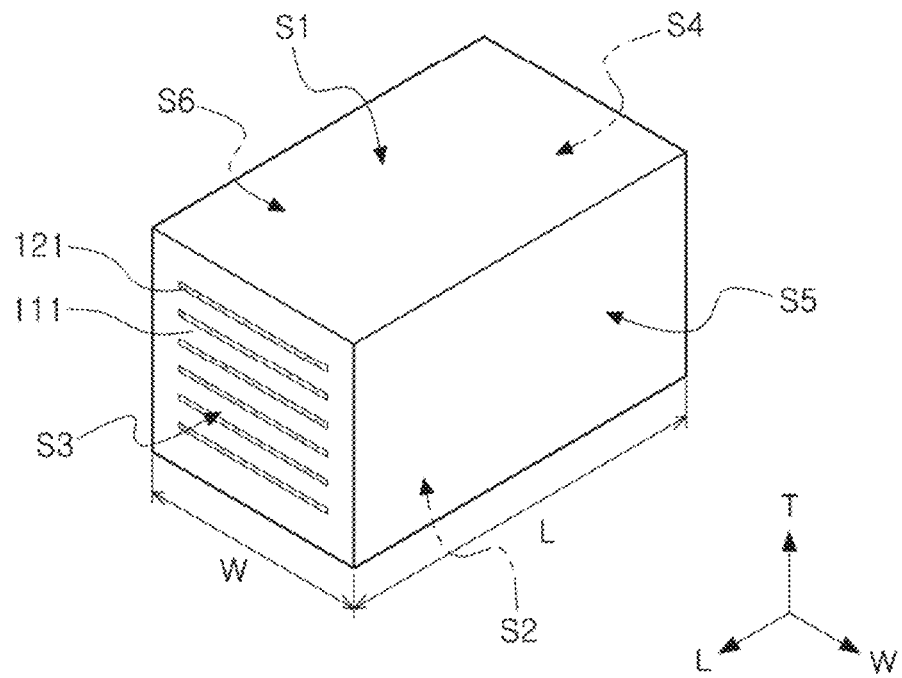
FIG. 2 is a schematic diagram of a ceramic body according to an exemplary embodiment of the present disclosure.
Figure 3:
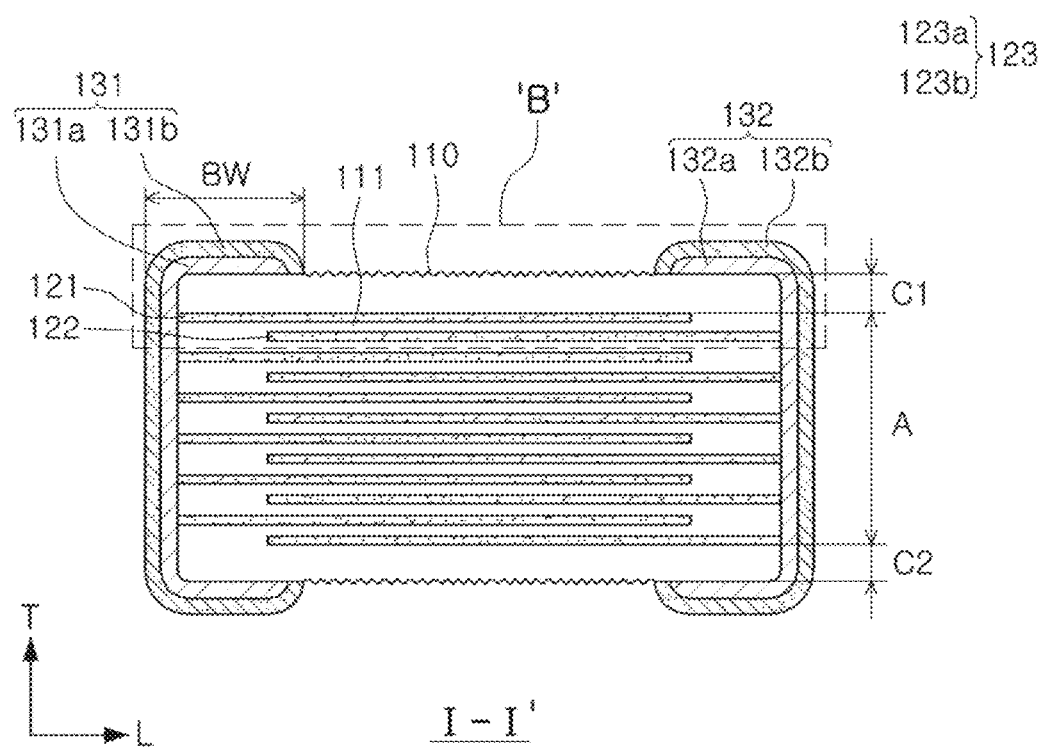
FIG. 3 is a cross-sectional view taken along line I-I' in FIG. 1.
Figure 4:
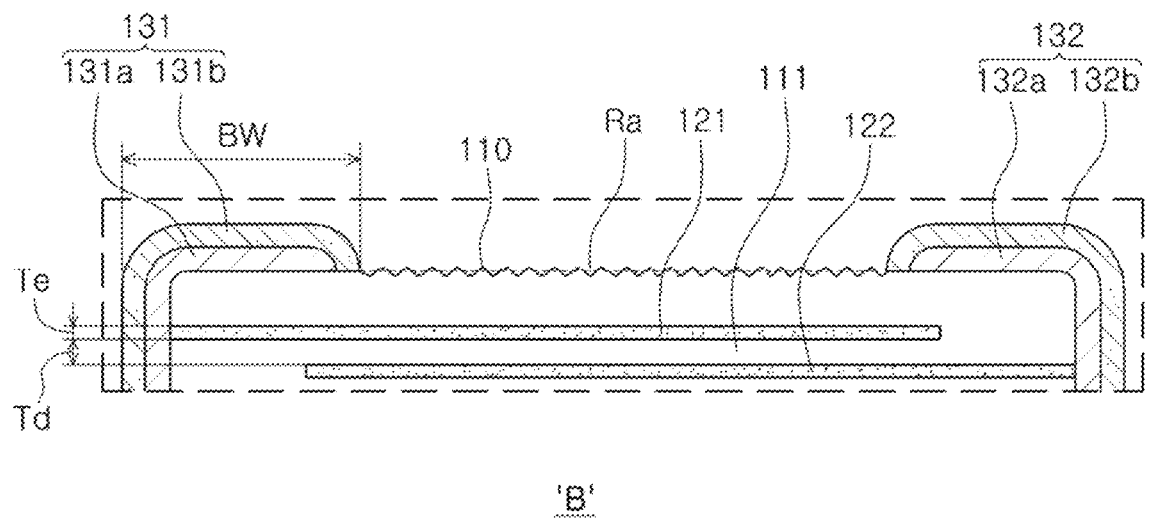
FIG. 4 is an enlarged view of region 'B' in FIG. 3.

FIG. 1 is a perspective view of a multilayer ceramic capacitor according to an exemplary embodiment in the present disclosure. FIG. 2 is a schematic diagram of a ceramic body according to an exemplary embodiment of the present disclosure. FIG. 3 is a cross-sectional view taken along line I-I' in FIG. 1, and FIG. 4 is an enlarged view of region 'B' in FIG. 3.

Referring to FIGS. 1 to 4, a multilayer ceramic capacitor 100 according to an exemplary embodiment may include a ceramic body 110 and external electrodes 131 and 132. The ceramic body 110 includes dielectric layers 111 and a plurality of internal electrodes 121 and 122 disposed to face each other with each of the dielectric layers interposed therebetween. The ceramic body 110 has a first surface S1 and a second surface S2 disposed to oppose each other in a first direction, a third surface S3 and a fourth surface S4 connected to the first surface S1 and the second surface S2 and disposed to oppose each other in a second direction, and a fifth surface S5 and a sixth surface S6 connected to the first surface S1 to the fourth surface S4 and disposed to oppose each other in a third direction. The external electrodes 131 and 132 are disposed on external surfaces of the ceramic body 110 and are electrically connected to the plurality of internal electrodes 121 and 122. The ceramic body 110 includes an active portion A, in which capacitance is formed by including the plurality of internal electrodes 121 and 122 disposed to face each other with each of the dielectric layers 111 interposed therebetween, and cover portions C1 and C2 disposed above and below the active portion A, respectively.

Hereinafter, a multilayer ceramic electronic component according to an exemplary embodiment will be described, in detail, a multilayer ceramic capacitor will be described. However, the multilayer ceramic electronic component is not limited thereto.

In the multilayer ceramic capacitor 100 according to an exemplary embodiment, a 'length direction' will be defined as an 'L' direction of FIG. 1, a 'width direction' will be defined as a 'W' direction of FIG. 1, and a 'thickness direction' will be defined as a 'T' direction of FIG. 1. The 'thickness direction' will be the same as a direction in which dielectric layers are laminated, for example, a 'laminated direction'.

A shape of the ceramic body 110 is not limited, but may be a rectangular parallelepiped shape as illustrated.

The ceramic body 110 may have a first surface S1 and a second surface S2 disposed to oppose each other in a first direction, a third surface S3 and a fourth surface S4 connected to the first surface S1 and the second surface S2 and disposed to oppose each other in a second direction, and a fifth surface S5 and a sixth surface S6 connected to the first surface S1 to the fourth surface S4 and disposed to oppose each other in a third direction.

The first and second surfaces S1 and S2 may be defined as surfaces disposed to oppose each other in a thickness direction of the ceramic body 110, that is, the first direction. The third and fourth surfaces S3 and S4 may be defined as surfaces disposed to oppose each other in a length direction of the ceramic body 110, that is, the second direction. The fifth and sixth surfaces S5 and S6 may be defined as surfaces disposed to oppose each other in a width direction of the ceramic body 110, that is, the third direction.

One ends of the plurality of internal electrodes 121 and 122 disposed in the ceramic body 110 are exposed to the third surface S3 or the fourth surface S4 of the ceramic body 110.

The internal electrodes 121 and 122 may include a pair of first and second internal electrodes 121 and 122 having polarities different from each other.

One ends of the first internal electrodes 121 may be exposed to the third surface S3, and one ends of the second internal electrode 122 may be exposed to the fourth surface S4.

The other ends of the first internal electrodes 121 are spaced apart from the third surface S3 or the fourth surface S4 at regular intervals, which will be described in detail later.

The first and second external electrodes 131 and 132 may be disposed on the third and fourth surfaces S3 and S4 of the ceramic body 110, respectively, and may be electrically connected to the internal electrodes.

In an exemplary embodiment, a raw material for forming the dielectric layer 111 is not limited as long as sufficient capacitance may be obtained. For example, the raw material for forming the dielectric layer 111 may be a barium titanate-based material, a lead complex Perovskite-based material, a strontium titanate-based material, or the like.

The raw material for forming the dielectric layer 111 may be prepared by adding various ceramic additives, organic solvents, plasticizers, binders, dispersants, and the like, to powder particles such as the barium titanate ($BaTiO_3$) powder particles, or the like, according to an object of the present disclosure.

The ceramic body 110 may include an active portion A as a portion of the capacitor contributing to formation of capacitance, and a top cover portion C1 and a bottom cover portion C2, as margin portions, disposed above and below the active portion A, respectively.

The active portion A may be formed by repeatedly laminating the plurality of first and second electrodes 121 and 122 with each of the dielectric layers 111 interposed therebetween.

The top and bottom cover portions C1 and C2 may have the same material and configuration as the dielectric layer 111, except that internal electrodes are included therein.

For example, the top cover portion C1 and the bottom cover portion C2 may include a ceramic material such as a barium titanate ($BaTiO_3$)-based ceramic material.

The top cover portion C1 and the bottom cover portion C2 may be formed by vertically laminating a single dielectric layer or two or more dielectric layers on top and bottom surfaces of the active portion A, and may basically serve to prevent the internal electrodes 121 and 122 from being damaged by physical or chemical stress.

A material for forming the first and second internal electrodes 121 and 122 is not limited, but may be a conductive paste including one or more of silver (Ag), lead (Pb), platinum (Pt), nickel (Ni), and copper (Cu).

A multilayer ceramic capacitor according to an exemplary embodiment may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122 to form capacitance, and the second external electrode 132 may be connected to a potential different from a potential to which the first external electrode 131 is connected.

The first and second external electrodes 131 and 132 may be disposed on the third surface S3 and the fourth surface S4 in the length direction of the ceramic body 110, that is, the second direction, respectively, and may be disposed to extend to the first surface S1 and the second surface S2 in the thickness direction of the ceramic body 110, that is, the first direction.

The external electrodes 131 and 132 are disposed on external surfaces of the ceramic body 111, and may include electrode layers 131a and 132a electrically connected to the internal electrodes 121 and 122 and conductive resin layers 131b and 132b disposed on the electrode layers 131a and 132a.

The electrode layers 131a and 132a may include a conductive metal and a glass.

The conductive metal used in the electrode layers 131a and 132a is not limited as long as a material thereof may be electrically connected to the internal electrode to form capacitance, but may be, for example, at least one selected from the group consisting of copper (Cu), silver (Ag), nickel (Ni), and alloys thereof.

The electrode layers 131a and 132a may be formed by applying a conductive paste prepared by adding a glass frit to the conductive metal powder particles and sintering the conductive paste.

The conductive resin layers 131b and 132b are disposed on the electrode layers 131a and 132a, and may be disposed to completely cover the electrode layers 131a and 132a.

A base resin included in the conductive resin layers 131b and 132b is not limited as long as a material thereof may be mixed with conductive metal powder particles to prepare a paste, and may include, for example, an epoxy-based resin.

A conductive metal included in the conductive resin layers 131b and 132b is not limited as long as a material thereof may be electrically connected to the electrode layers 131a and 132a, and may include, for example, at least one selected from the group consisting of copper (Cu), silver (Ag), nickel (Ni), and alloys thereof.

According to an exemplary embodiment, the conductive resin layers 131b and 132b are disposed to extend to the first and second surfaces S1 and S2 of the ceramic body 110. When a distance from an outer edge of one of the first or second external electrodes 131 or 132 disposed on the first or second surface S1 or S2 to an inner edge thereof is defined as BW and surface roughness of the ceramic body 110 is defined as Ra, a ratio of 100 times the surface roughness Ra to the distance BW satisfies (Ra*100/BW)≤1.0.

According to an exemplary embodiment, the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW) satisfies (Ra*100/BW)≤1.0, improving flexural strength of a multilayer ceramic capacitor.

In the case in which the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW) is greater than 1.0, a frequency of flexural cracking occurring may be increased. In this case, flexural strength of 5 millimeters (mm) or more cannot be ensured.

The term 'surface roughness' refers to a degree of fine unevenness formed on a metal surface when the metal surface is processed.

Surface roughness is generated due to a tool used for processing, whether or not a processing method is appropriate, grooves formed as a surface is scratched, or rust, or the like is formed. In determining a degree of roughness, a surface is cut in a direction perpendicular thereto and a cross-section thereof having a certain curvature is checked. A height from the lowest point to the highest point of the curved line is taken and determined as an average central line roughness denoted by Ra.

In the present embodiment, it is defined that surface roughness of the ceramic body 110 is Ra, as shown in FIG. 4.

The surface roughness of sandpaper may be transferred to a surface of the ceramic body 110 by placing the sandpaper on the surface of the ceramic body 110 at the time of a compressing process, undertaken to generate surface roughness on the surface of the ceramic body 110. The sandpaper may have a P value ranging from 100 to 3000.

The 'P' of the sandpaper is a symbol for a particle size standard of the Federation of European Producers of Abrasives (FEPA) "P" grade.

Center line average roughness of the ceramic body 110 (Ra) is a value obtained by calculating the roughness of the ceramic body 110 having a surface on which roughness is generated, and may refer to roughness of the ceramic body 110, calculated by obtaining an average value based on a virtual center line of the roughness.

Specifically, referring to FIG. 4, in a method of calculating the centerline average roughness Ra of the ceramic body 110, the virtual center line may be drawn with respect to the roughness formed on one surface of the ceramic body 110.

After respective distances based on the virtual center line of the roughness (for example, r1, r2, r3, . . . , and Rn) are measured, an average value of the respective distances is calculated according to the following equation. Through the average value, the center line average roughness of the ceramic body 110 (Ra) may be calculated.

$$R_a = \frac{|r_1| + |r_2| + |r_3| + \ldots |r_n|}{n}$$

The center line average roughness Ra of the ceramic body 110 is adjusted within a certain numerical range. In detail, the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW) may be adjusted to satisfy (Ra*100/BW)≤1.0, improving flexural strength of a multilayer ceramic capacitor.

The surface roughness Ra of the ceramic body 110 may be 1.0 micrometer (μm) or more.

According to an exemplary embodiment, the surface roughness Ra of the ceramic body 110 may be adjusted to be 1.0 μm or more to improve flexural strength, in detail, to improve interfacial adhesion of the external electrodes 131 and 132 to the ceramic body 110.

In the case in which the surface roughness Ra of the ceramic body 110 is less than 1.0 μm, the interfacial adhesion of the external electrodes 131 and 132 to the ceramic body 110 may be reduced due to the low roughness.

In this case, the ceramic body 110 may be delaminated to degrade reliability of a multilayer ceramic electronic component.

According to an exemplary embodiment, in the case in which a size of the multilayer ceramic electronic component 100 is less than 3216 size (length: 3.2±0.05 mm, width: 1.6±0.05 mm), the distance BW from an outer edge of one of the first or second external electrodes 131 or 132 disposed on the first or second surface S1 or S2 to an inner edge thereof may be greater than 0.2 mm.

In the case in which the size of the multilayer ceramic electronic component 100 is less than 3216 size (length: 3.2±0.05 mm, width: 1.6±0.05 mm), when the distance BW from an outer edge of one of the first or second external electrodes 131 or 132 disposed on the first or second surface S1 or S2 to an inner edge thereof is less than or equal to 0.2 mm, humidity resistance reliability may be degraded by penetration of a plating solution and stress applied to a ceramic body may be concentrated on a corner of the ceramic body to reduce flexural strength due to the short distance BW. Thus, a defect rate may be increased.

According to an exemplary embodiment, in the case in which a size of the multilayer ceramic electronic component 100 is less than 3216 size (length: 3.2±0.05 mm, width: 1.6±0.05 mm), the distance BW from an outer edge of one of the first or second external electrodes 131 or 132 disposed on the first or second surface S1 or S2 to an inner edge thereof may be greater than 0.2 mm and the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW) may satisfy (Ra*100/BW)≤1.0.

The conditions may be satisfied, allowing the multilayer ceramic electronic component 100 according to an exemplary embodiment to ensure flexural strength of 5 mm or more.

On the other hand, in the case in which a size of the multilayer ceramic electronic component 100 is greater than or equal to 3216 size (length: 3.2±0.05 mm, width: 1.6±0.05 mm), the distance BW from an outer edge of one of the first or second external electrodes 131 or 132 disposed on the first or second surface S1 or S2 to an inner edge thereof may be greater than 0.6 mm.

In the case in which a size of the multilayer ceramic electronic component 100 is greater than or equal to 3216 size (length: 3.2±0.05 mm, width: 1.6±0.05 mm), when the distance BW from an outer edge of one of the first or second external electrodes 131 or 132 disposed on the first or second surface S1 or S2 to an inner edge thereof is less than or equal to 0.6 mm, humidity resistance reliability may be degraded by penetration of a plating solution and stress applied to a ceramic body may be concentrated on a corner of the ceramic body to reduce flexural strength due to the short distance BW. Thus, a defect rate may be increased.

According to an exemplary embodiment, in the case in which a size of the multilayer ceramic electronic component 100 is greater than or equal to 3216 size (length: 3.2±0.05 mm, width: 1.6±0.05 mm), the distance BW from an outer edge of one of the first or second external electrodes 131 or 132 disposed on the first or second surface S1 or S2 to an inner edge thereof may be greater than 0.6 mm and the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW) may satisfy (Ra*100/BW)≤1.0.

The conditions may be satisfied, allowing the multilayer ceramic electronic component 100 according to an exemplary embodiment to ensure flexural strength of 5 mm or more.

Referring to FIG. 4, in a multilayer ceramic electronic component according to an exemplary embodiment, a thickness of the dielectric layer 111 (td) and a thickness of each of the internal electrodes 121 and 122 (te) may satisfy td>2×te.

For example, according to an exemplary embodiment, the thickness of the dielectric layer 111 (td) is twice greater than the thickness of each of the internal electrodes 121 and 122 (te).

In general, a major issue of an electronic component for a high-voltage electrical component is a reliability problem resulting from a decrease in dielectric breakdown voltage under a high-voltage environment.

To prevent a dielectric breakdown voltage from decreasing under a high-voltage environment, the dielectric layer 111 may be formed to have the thickness td twice greater than the thickness te of each of the internal electrodes 121 and 122. Thus, dielectric breakdown voltage characteristics may be improved by increasing a thickness of the dielectric layer 111, that is, a distance between the internal electrodes 121 and 122.

When the thickness of the dielectric layer 111 (td) is not more than twice the thickness of each of the internal electrodes 121 and 122 (te), the thickness of the dielectric layer 111, that is, a distance between the internal electrodes 121 and 122 is small, and thus the dielectric breakdown voltage may be decreased.

Each of the internal electrodes 121 and 122 may have a thickness td of 2.8 μm or less and the dielectric layer 111 may have a thickness td of 2.8 μm or less, but the thicknesses thereof are not limited thereto.

Hereinafter, a method of manufacturing a multilayer ceramic electronic component according to an exemplary embodiment will be described, but is not limited thereto.

In the method of manufacturing a multilayer ceramic electronic component according to an exemplary embodiment, slurry including powder particles such as barium titanate ($BaTiO_3$) powder particles, or the like, may be first applied onto carrier films and dried to prepare a plurality of ceramic green sheets, resulting in formation of dielectric layers.

The ceramic green sheet may be manufactured by preparing slurry by mixing ceramic powder particles, a binder, and a solvent with one another and manufacturing the slurry in a sheet shape having a thickness of several μm by a doctor blade method.

Next, a conductive paste for an internal electrode including 40 to 50 parts by weight of nickel powder particles having an average particle size of 0.1 to 0.2 μm may be prepared.

The conductive paste for an internal electrode was applied onto ceramic green sheets by a screen printing method to form internal electrodes, and the ceramic green sheets on which internal electrode patterns are disposed were laminated to form the ceramic body 110.

External electrode layers including a conductive metal and a glass may be formed on the external surfaces of the ceramic body 110. The conductive metal may be at least one selected from the group consisting of copper (Cu), silver (Ag), nickel (Ni), and alloys thereof.

The glass is not limited, but may be a material having the same composition as a glass used to manufacture an external electrode of a typical multilayer ceramic capacitor.

The external electrode layers may be formed on top and bottom surfaces and end portions of the ceramic body to be electrically connected to the first and second internal electrodes, respectively.

The electrode layer may contain 5 volume percent (vol %) or more of the glass relative to the conductive metal.

A conductive resin composite may applied onto the electrode layers 131a and 132a, and may then be cured to form conductive resin layers 131b and 132b.

The conductive resin layers 131b and 132b may include a base resin and at least one conductive metal selected from the group consisting of copper (Cu), silver (Ag), nickel (Ni), and alloys thereof. The base resin may be an epoxy resin.

According to an exemplary embodiment, the conductive resin layers 131b and 132b are disposed to extend to first and second surfaces S1 and S2 of the ceramic body 110, and the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW) satisfies (Ra*100/BW)≤1.0.

Hereinafter, Table (1) shows measured frequency of occurrence of flexural cracking depending on the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW).

In Table (1), each sample of multilayer ceramic electronic component had a size less than 3216 size (length: 3.2±0.05 mm, width: 1.6±0.05 mm) and was fabricated to have 1608 size (length: 1.6±0.05 mm, width: 0.8±0.05 mm).

The frequency of occurrence of flexural cracking was measured. When samples of the multilayer ceramic electronic component was bent after being mounted on a board, a distance from a pressed central portion was set to be 6 mm and the frequency was measured on respective 60 samples to watch whether flexural strength was ensured at the distance of 6 mm.

Even when only one defect occurred in the respective 60 samples, the flexural strength at the distance of 6 mm was determined to be defective.

TABLE (1)

| Sample | Ra (μm) | BW (mm) | Ra * 100/BW | Frequency of Defect |
|---|---|---|---|---|
| *1 | 1.5 | 0.2 | 0.8 | 1/60 |
| 2 | 1.5 | 0.3 | 0.5 | 0/60 |
| 3 | 1.5 | 0.5 | 0.3 | 0/60 |
| 4 | 1.5 | 0.7 | 0.2 | 0/60 |
| *5 | 3.0 | 0.2 | 1.5 | 2/60 |
| 6 | 3.0 | 0.3 | 1.0 | 0/60 |
| 7 | 3.0 | 0.5 | 0.6 | 0/60 |
| 8 | 3.0 | 0.7 | 0.4 | 0/60 |
| *9 | 5.0 | 0.2 | 2.5 | 4/60 |
| *10 | 5.0 | 0.3 | 1.7 | 1/60 |
| 11 | 5.0 | 0.5 | 1.0 | 0/60 |
| 12 | 5.0 | 0.7 | 0.7 | 0/60 |
| *13 | 7.0 | 0.2 | 3.5 | 7/60 |
| *14 | 7.0 | 0.3 | 2.3 | 3/60 |
| 15 | 7.0 | 0.5 | 1.4 | 0/60 |
| 16 | 7.0 | 0.7 | 1.0 | 0/60 |

*Comparative Example

Referring to Table (1), in the case in which each sample of the multilayer ceramic electronic component had 1608 size (length: 1.6±0.05 mm, width: 0.8±0.05 mm), flexural strength characteristics are satisfactory at the distance of 6 mm only in samples 2 to 4, 6 to 8, 11 and 12, and 15 and 16 in which the distance BW from one end portions of the conductive resin layers 131b and 132b to the other ends thereof disposed on the first and second surfaces S1 and S2 was greater than 0.2 mm and the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW) satisfied (Ra*100/BW)≤1.0.

Table (2) shows measured frequency of occurrence of flexural cracking depending on the ratio of 100 times the surface roughness Ra of the ceramic body 110 to the distance BW from an outer edge of one of the first or second external electrodes 131 or 132 disposed on the first or second surface S1 or S2 to an inner edge thereof (Ra*100/BW).

In Table (2), each sample of multilayer ceramic electronic component was fabricated to have 3216 size (length: 3.2±0.05 mm, width: 1.6±0.05 mm).

The frequency of occurrence of flexural cracking was measured. When samples of the multilayer ceramic electronic component was bent after being mounted on a board, a distance from a pressed central portion was set to be 6 mm and the frequency was measured on respective 60 samples to watch whether flexural strength was ensured at the distance of 6 mm.

Even when only one defect occurred in the respective 60 samples, the flexural strength at the distance of 6 mm was determined to be defective.

TABLE (2)

| Sample | Ra (μm) | BW (mm) | Ra * 100/BW | Frequency of Defect |
|---|---|---|---|---|
| *1 | 1.5 | 0.4 | 0.4 | 2/60 |
| *2 | 1.5 | 0.6 | 0.3 | 1/60 |
| 3 | 1.5 | 0.8 | 0.2 | 0/60 |
| 4 | 1.5 | 0.9 | 0.2 | 0/60 |
| *5 | 3.0 | 0.4 | 0.8 | 3/60 |
| *6 | 3.0 | 0.6 | 0.5 | 1/60 |
| 7 | 3.0 | 0.8 | 0.4 | 0/60 |
| 8 | 3.0 | 0.9 | 0.3 | 0/60 |
| *9 | 5.0 | 0.4 | 1.3 | 4/60 |
| *10 | 5.0 | 0.6 | 0.8 | 2/60 |
| 11 | 5.0 | 0.8 | 0.6 | 0/60 |
| 12 | 5.0 | 0.9 | 0.6 | 0/60 |

TABLE (2)-continued

| Sample | Ra (μm) | BW (mm) | Ra * 100/BW | Frequency of Defect |
|---|---|---|---|---|
| *13 | 7.0 | 0.4 | 1.8 | 5/60 |
| *14 | 7.0 | 0.6 | 1.2 | 2/60 |
| 15 | 7.0 | 0.8 | 0.9 | 0/60 |
| 16 | 7.0 | 0.9 | 0.8 | 0/60 |

*Comparative Example

Referring to Table (2), in the case in which each sample of the multilayer ceramic electronic component had 3216 size (length: 3.2±0.05 mm, width: 1.6±0.05 mm), flexural strength characteristics are satisfactory at the distance of 6 mm only in samples 3 and 4, 7 and 8, 11 and 12, and 15 and 16 in which the distance BW from an outer edge of one of the first or second external electrodes 131 or 132 disposed on the first or second surface S1 or S2 to an inner edge thereof S1 or S2 was greater than 0.6 mm and the ratio of 100 times the surface roughness Ra of the ceramic body 110 to the distance BW from an outer edge of one of the first or second external electrodes 131 or 132 disposed on the first or second surface S1 or S2 to an inner edge thereof S1 or S2 (Ra*100/BW) satisfied (Ra*100/BW)≤1.0.

As described above, according to an exemplary embodiment, a ratio of 100 times surface roughness Ra of the ceramic body to a distance BW from an outer edge of one of the first or second external electrodes 131 or 132 disposed on the first or second surface S1 or S2 to an inner edge thereof may be adjusted to improve flexural strength. Thus, reliability may be improved.

In addition, surface roughness of the ceramic body may be secured to be a predetermined value or more. Thus, interfacial adhesion of external electrodes to the ceramic body may be improved.

While exemplary embodiments have been shown and described above, it will be apparent to those skilled in the art that modifications and variations could be made without departing from the scope of the present invention as defined by the appended claims.

What is claimed is:
1. A multilayer ceramic electronic component comprising:
a ceramic body including dielectric layers and a plurality of internal electrodes disposed to face each other with each of the dielectric layers interposed therebetween, the ceramic body having first and second surfaces disposed to oppose each other in a thickness direction, third and fourth surfaces connected to the first and second surfaces and disposed to oppose each other in a length direction, and fifth and sixth surfaces connected to the first to fourth surfaces and disposed to oppose each other; and
first and second external electrodes disposed on the third and fourth surfaces of the ceramic body and electrically connected to the internal electrodes, respectively,
wherein the first and second external electrodes include electrode layers electrically connected to the internal electrodes and conductive resin layers disposed on the electrode layers, and the first and second external electrodes extend to the first and second surfaces of the ceramic body,
(Ra*100/BW)≤1.0, where Ra is a surface roughness of the first or second surface of the ceramic body, and BW is a distance from an outer edge of one of the first or second external electrodes disposed on the first or second surface to an inner edge thereof, and wherein the surface roughness of the first or second surface of the ceramic body is greater than 1.5 micrometer.

2. The multilayer ceramic electronic component of claim 1, wherein a size of the multilayer ceramic electronic component is less than 3216 size (length: 3.2±0.05 mm, width: 1.6±0.05 mm), and the distance BW from an outer edge of one of the first or second external electrodes disposed on the first or second surface to an inner edge thereof is greater than 0.2 millimeter.

3. The multilayer ceramic electronic component of claim 1, wherein a size of the multilayer ceramic electronic component is greater than or equal to 3216 size (length: 3.2±0.05 mm, width: 1.6±0.05 mm), and the distance BW from an outer edge of one of the first or second external electrodes disposed on the first or second surface to an inner edge thereof is greater than 0.6 millimeter.

4. The multilayer ceramic electronic component of claim 1, wherein the electrode layers include at least one conductive metal selected from the group consisting of copper (Cu), silver (Ag), nickel (Ni), and alloys thereof.

5. The multilayer ceramic electronic component of claim 1, wherein the conductive resin layers include a base resin and at least one conductive metal selected from the group consisting of copper (Cu), silver (Ag), nickel (Ni), and alloys thereof.

6. The multilayer ceramic electronic component of claim 1, wherein each of the internal electrodes has a thickness less than 1 micrometer.

7. The multilayer ceramic electronic component of claim 1, wherein each of the dielectric layers has a thickness less than 2.8 micrometers.

8. The multilayer ceramic electronic component of claim 1, wherein td>2×te, where td is a thickness of each of the dielectric layers, and te is a thickness of each of the internal electrodes.

9. The multilayer ceramic electronic component of claim 1, wherein the electrode layers contain glass and a conductive metal.

10. The multilayer ceramic electronic component of claim 1, wherein the electrode layers and the conductive resin layers extend to the first and second surfaces of the ceramic body, and the conductive resin layers extend beyond the electrode layers to be in direct contact with the ceramic body.

11. The multilayer ceramic electronic component of claim 1, wherein the surface roughness of the first or second surface of the ceramic body extends from the first external electrode to the second external electrode.

12. A multilayer ceramic electronic component comprising:
a ceramic body including dielectric layers and a plurality of internal electrodes disposed to face each other with each of the dielectric layers interposed therebetween, the ceramic body having first and second surfaces disposed to oppose each other in a thickness direction, third and fourth surfaces connected to the first and second surfaces and disposed to oppose each other in a length direction, and fifth and sixth surfaces connected to the first to fourth surfaces and disposed to oppose each other; and
first and second external electrodes disposed on the third and fourth surfaces of the ceramic body and electrically connected to the internal electrodes, respectively,
wherein the first and second external electrodes include electrode layers electrically connected to the internal electrodes and conductive resin layers disposed on the electrode layers, and the first and second external electrodes extend to the first and second surfaces of the ceramic body,
(Ra*100/BW)≤1.0, where Ra is a surface roughness of the first or second surface of the ceramic body, and BW is a distance from an outer edge of one of the first or second external electrodes disposed on the first or second surface to an inner edge thereof,
wherein the conductive resin layers are outermost layers of the first and second external electrodes, and
wherein the surface roughness of the first or second surface of the ceramic body is greater than 1.5 micrometer.

13. The multilayer ceramic electronic component of claim 12, wherein the surface roughness of the first or second surface of the ceramic body extends from the first external electrode to the second external electrode.

14. A multilayer ceramic electronic component comprising: a ceramic body including dielectric layers and a plurality of internal electrodes disposed to face each other with each of the dielectric layers interposed therebetween, the ceramic body having first and second surfaces disposed to oppose each other in a thickness direction, third and fourth surfaces connected to the first and second surfaces and disposed to oppose each other in a length direction, and fifth and sixth surfaces connected to the first to fourth surfaces and disposed to oppose each other; and first and second external electrodes disposed on the third and fourth surfaces of the ceramic body and electrically connected to the internal electrodes, respectively, wherein the first and second external electrodes include electrode layers electrically connected to the internal electrodes and conductive resin layers disposed on the electrode layers, and the first and second external electrodes extend to the first and second surfaces of the ceramic body, (Ra*100/BW)<1.0, where Ra is a surface roughness of the first or second surface of the ceramic body, and BW is a distance from an outer edge of one of the first or second external electrodes disposed on the first or second surface to an inner edge thereof, and wherein the first and second externa electrodes are devoid of a surface roughness; wherein the surface roughness of the first or second surface of the ceramic body is greater than 1.5 micrometer.

15. The multilayer ceramic electronic component of claim 14, wherein the surface roughness of the first or second surface of the ceramic body extends from the first external electrode to the second external electrode.

* * * * *